United States Patent [19]

Aoki

[11] 4,380,423
[45] Apr. 19, 1983

[54] DEVICE FOR CUTTING SPRUE OF PARISON WITH BOTTOM

[76] Inventor: Katashi Aoki, 6037 Ohazaminamijo, Sakakimachi, Hanishina-gun, Nagano-ken, Japan

[21] Appl. No.: 197,558

[22] Filed: Oct. 16, 1980

[30] Foreign Application Priority Data

Oct. 19, 1979 [JP] Japan ................................ 54-134936

[51] Int. Cl.³ .................... B29C 17/12; B26D 1/09; B26D 7/10
[52] U.S. Cl. .................................... 425/289; 83/170; 83/198; 264/535; 264/536; 264/161; 425/526; 425/531; 425/297; 525/305.1; 425/806
[58] Field of Search ............... 425/526, 531, 289, 297, 425/305.1, 806; 264/536, 161, 535; 83/170, 198

[56] References Cited

U.S. PATENT DOCUMENTS

| | | | |
|---|---|---|---|
| 2,789,312 | 4/1957 | Borer | 425/526 |
| 2,898,972 | 8/1959 | Strong | 425/531 X |
| 3,382,532 | 5/1968 | Schweiger | 425/526 X |
| 3,940,231 | 2/1976 | Unug | 425/526 X |
| 4,049,761 | 9/1977 | Lorgr' et al. | 264/161 X |

Primary Examiner—Jan H. Silbaugh
Attorney, Agent, or Firm—Charles E. Pfund

[57] ABSTRACT

A device for cutting off a sprue of a parison with a bottom is capable of cutting off the sprue in a heating furnace. Cutter plates for cutting the sprue and an outlet for discharging the cut sprue are disposed at the bottom of the heating furnace. Cutting off the sprue may thus be performed without changing the usual molding cycle of the hot parison molding method. The device may alternatively be applied to the cold parison molding method.

5 Claims, 4 Drawing Figures

DEVICE FOR CUTTING SPRUE OF PARISON WITH BOTTOM

BACKGROUND OF THE INVENTION

The present invention relates to a device for cutting a sprue protruding from the bottom of an injection molded parison with a bottom.

In a parison with a bottom obtained by injection molding, a sprue protrudes at the center of the bottom part. This sprue is unnecessary for molding. The slightly protruding sprue may be smashed during hollow molding or stretching and blow molding for hollow molding of a bottle or the like so that it may not present problems for molding. However, with a sprue which has a large diameter or long extension, the bottom shape of the hollow molded product may not be good and the strength at the bottom may be degraded.

It thus becomes necessary to cut away the sprue from the parison with a bottom. However, it is considered to be extremely difficult to cut the sprue while transporting the parison with a bottom to the mold for stretching and blow molding in a hot parison method for continuously performing the steps of injection molding of the parison with a bottom, the temperature adjustment, and stretching and blow molding, unlike in the case of separately performing the injection molding of the parison with a bottom and the stretching and blow molding of the parison with a bottom.

SUMMARY OF THE INVENTION

It is, therefore, an object of the present invention to provide a device which is capable of cutting away the sprue of a parison with a bottom without changing the molding cycle of the hot parison method for continuously performing the steps of injection molding of the parison with a bottom, temperature adjustment, stretching and blow molding, and releasing the hollow product from the mold.

It is another object of the present invention to provide a device for cutting the sprue of a parison with a bottom, which may be readily applied to the cold parison method.

In order to accomplish the above and other ends, there is provided according to the present invention a device for cutting a sprue of an injection molded parison with a bottom in a heating furnace for adjusting the temperature of the parison to a temperature suitable for blowing or stretching and blow molding, characterized in that cutter plates for cutting the sprue and an outlet for discharging the sprue to the outside are disposed at the bottom of the heating furnace.

BRIEF DESCRIPTION OF THE DRAWINGS

A device for cutting the sprue of the parison with a bottom according to one embodiment of the present invention is shown in the accompanying drawings wherein.

DETAILED DESCRIPTION OF THE PREFERRED EMBODIMENT

Figure 1:
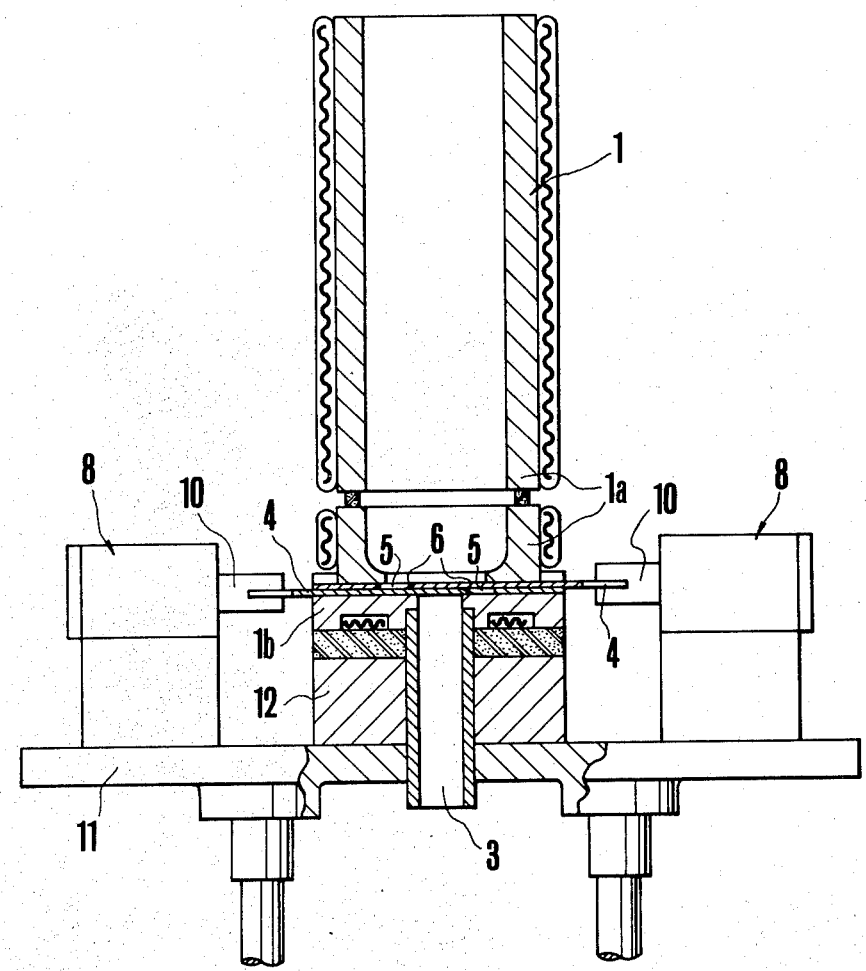
FIG. 1 is a longitudinal sectional front view.
Figure 2:
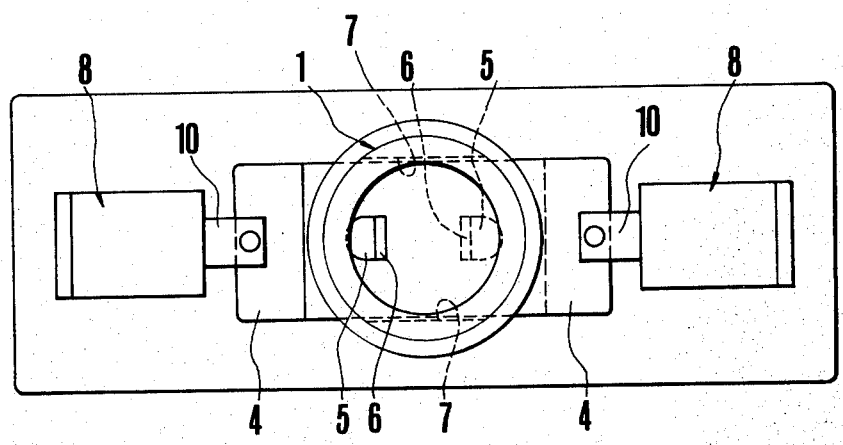
FIG. 2 is a plan view.
Figure 3:
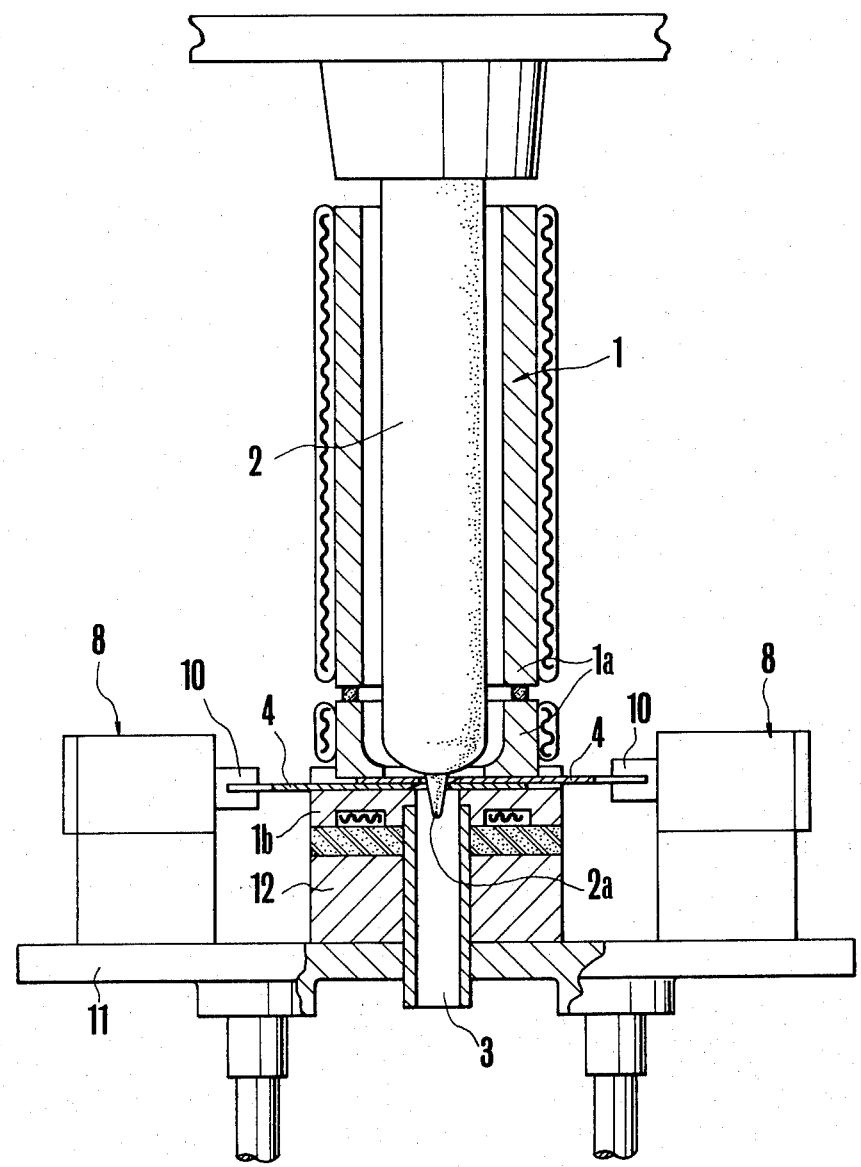
FIG. 3 is a longitudinal sectional front view illustrating the case when the parison with a bottom is inserted.
Figure 4:
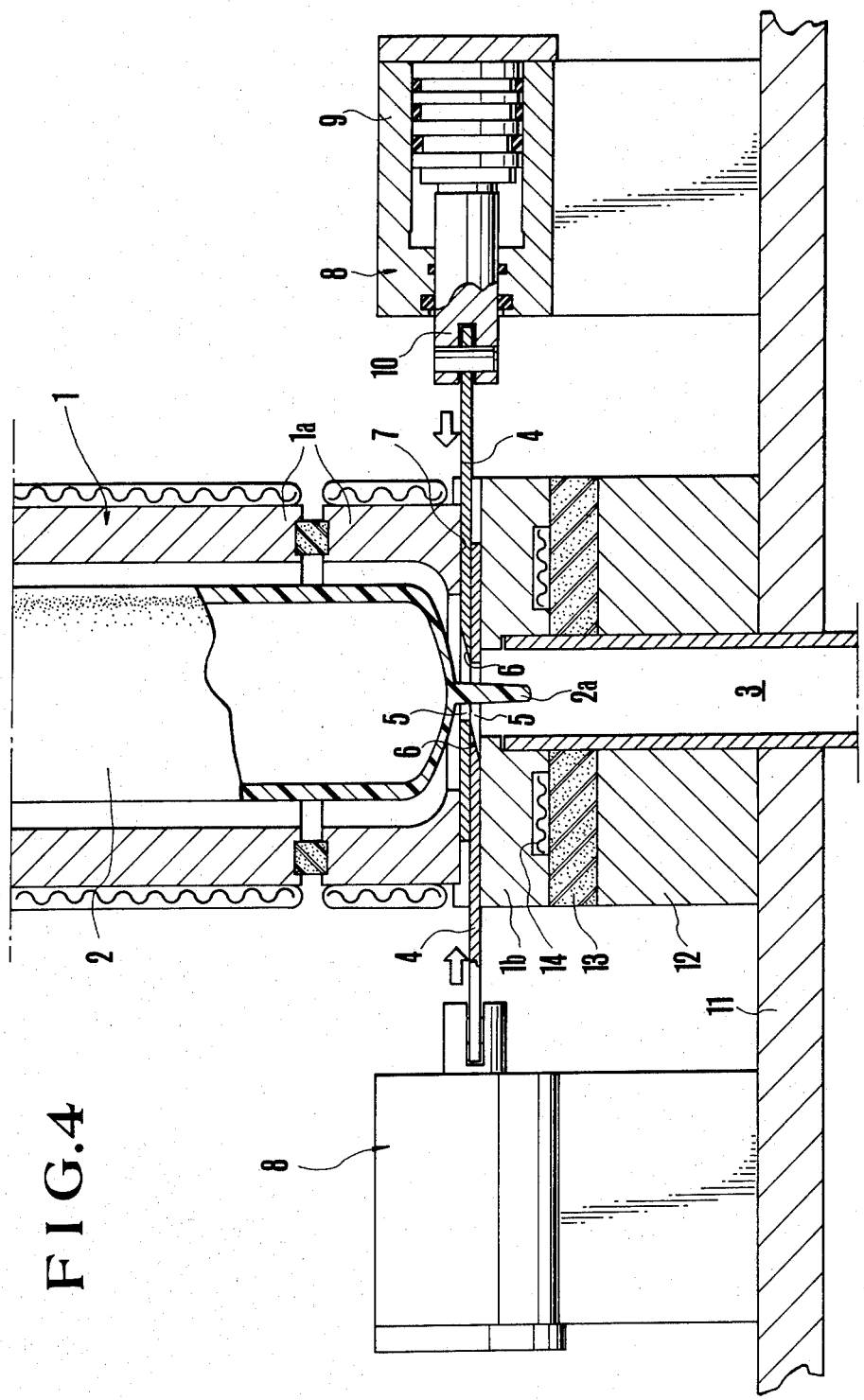
FIG. 4 is a schematic longitudinal sectional front view of the same.

The present invention will now be described by way of example in more detail. Numeral 1 denotes a cylindrical heating furnace and a parison 2 with a bottom may be inserted from the upper part opening to the bottom part. Numeral 3 denotes an outlet for a sprue 2a, which is formed vertically at the center of the bottom part of the heating furnace 1. A pair of cutter plates 4 are mounted at the upper part of the outlet 3.

These cutter plates 4 are steel plates of flat rectangular shape having respective sprue holes 5 with blades 6 at part of the sides of the sprue holes. These cutter plates 4 are slidably inserted in respective slits 7 horizontally formed between a side wall 1a and a bottom plate 1b of the heating furnace 1 in such a manner that the blades 6 fit with each other at the center of the outlet 3.

Numeral 8 denotes reciprocal devices for the respective cutter plates. Each of the reciprocal devices 8 comprises an air cylinder 9 and a piston 10. The outer end of each of the cutter plates 4 is connected to the front end of the corresponding piston 10.

Numeral 11 denotes a base plate for the heating furnace 1 and the reciprocal devices 8. The heating furnace is disposed through a heat insulating material 13 on a base block 12 secured to the base plate 11, so that the heat generated from a heater 14 disposed at the bottom surface of a bottle plate 1b is not transmitted to the base block side.

For cutting the sprue in the heating furnace, the cutter plates 4 are first set so that the sprue holes 5 are vertically aligned at the center. Then the parison 2 with a bottom is inserted in the heating furnace from above. The sprue 2a is directed toward the outlet 3 through the sprue holes 5 so that the blades 6 face both sides of the base of the sprue. The cutter plates 4 slide to clamp the sprue 2a and to cut away the sprue 2a. The cut sprue 2a drops in the outlet 3. The upper part of the outlet 3 is closed by the pair of cutter plates 4 for preventing thermal loss through the outlet 3 during the temperature adjustment of the parison 2 with a bottom.

The parison 2 with a bottom whose sprue 2a is cut away is drawn out from the heating furnace 1 after the temperature adjustment and is transferred to the mold for stretching and blow molding.

Although the above embodiment has been described with reference to cutting of the sprue in one heating furnace, sprues may be cut in a plurality of heating furnaces simultaneously. Although such an example is not shown in a figure, a pair of elongate cutter plates may be formed to encompass more than one heating furnaces, and sprue holes and blades may be formed for each of the respective heating furnaces. Therefore, the present invention is not limited to the particular construction of a single heating furnace.

As has been described, the sprue is cut in the heating furnace. Thus, a special stage for cutting the sprue need not be included. Furthermore, it is not necessary to modify the molding cycle for cutting the sprue during the temperature adjustment of the parison with a bottom. Since the cutter plates may also be used as a shutter, thermal losses may also be reduced. The present invention may be advantageously applied to the hot parison method as well as to the cold parison method. The construction does not have to be modified extensively, but only an outlet and cutting plates must be attached to the bottom part of the heating furnace. The device of the present invention is thus simple in construction and convenient for controlling the temperature of the heating furnace.

What is claimed is:

1. Apparatus comprising means defining a heating furnace having a closed cylindrical side wall and a bottom wall, said heating furnace having an open top dimensioned to receive an injection molded parison having a sprue at its lower end and said bottom wall containing a centrally positioned opening for receiving said sprue when the parison is positioned within the furnace, a pair of shears positiond adjacent the bottom opening movable transversely of the bottom opening in parallel relation thereto, said shears comprising face-to-face flat plates containing orifices which, when aligned, are concentric with the bottom opening and wherein the orifices are of a diameter to receive said sprue and define opposite cutting edges movable in shearing relation to each other by reciprocation and power operable means for effecting reciprocation of the blades.

2. Apparatus according to claim 1 wherein there is an apertured bottom plate at the bottom of the furnace, the aperture of which is centered with respect to the bottom opening, said bottom plate defining in conjunction with the bottom of the furnace a transverse slot within which are slidably mounted the blades, one above the other.

3. Apparatus according to claim 2 wherein the proximal ends of the blades contain the apertures and the power operable means are connected to the distal ends of the blades.

4. Apparatus according to claim 1 comprising means in the bottom plate for generating heat, a supporting base and insulating means positioned between the supporting base and the bottom plate to inhibit transfer of heat from the bottom plate to the supporting base.

5. Apparatus according to claim 1 wherein the opening at the bottom of the furnace provides for not only receiving the sprue, but also discharging the severed sprue and wherein the shear plates function as a shutter for closing the bottom opening.

* * * * *